United States Patent
Yoshizumi et al.

[11] Patent Number: 6,033,730
[45] Date of Patent: Mar. 7, 2000

[54] WEATHERED REEF-BUILDING CORAL MATERIAL

[75] Inventors: Satoshi Yoshizumi, Kanagawa; Toshiharu Oda, Okinawa, both of Japan

[73] Assignee: Coral Biotech Kabushiki Kaisha, Naha, Japan

[21] Appl. No.: 09/077,890

[22] PCT Filed: Oct. 15, 1997

[86] PCT No.: PCT/JP97/03718

§ 371 Date: Jun. 12, 1998

§ 102(e) Date: Jun. 12, 1998

[87] PCT Pub. No.: WO99/19259

PCT Pub. Date: Apr. 22, 1999

[51] Int. Cl.[7] .................. B05D 1/36; B05D 3/02; B05D 3/10; B05D 3/12

[52] U.S. Cl. .................. 427/244; 424/439; 424/489; 424/520; 424/549; 426/74; 427/215; 427/309; 427/337; 427/353; 427/354; 427/369; 427/430.1; 427/443.1; 210/500.1; 210/501; 210/506

[58] Field of Search .................. 427/4, 430.1, 443.1, 427/345, 350, 354, 308, 309, 377, 380, 383.3, 244, 352, 353, 215, 337, 369; 426/74; 424/439, 489, 520, 549; 210/500.1, 501, 506, 354, 355

[56] References Cited

U.S. PATENT DOCUMENTS

| | | | |
|---|---|---|---|
| 3,622,379 | 11/1971 | Fehmerling | 427/4 |
| 3,690,333 | 9/1972 | Kierner | 134/95 |
| 3,890,107 | 6/1975 | White et al. | 29/183 |
| 3,929,971 | 12/1975 | Roy | 423/308 |
| 3,955,018 | 5/1976 | Liberto | 427/4 |
| 4,314,380 | 2/1982 | Miyata et al. | 3/1.9 |
| 4,540,584 | 9/1985 | Someya | 424/156 |
| 4,770,860 | 9/1988 | Ewers et al. | 423/173 |
| 5,169,682 | 12/1992 | Asai | 427/217 |
| 5,355,901 | 10/1994 | Mielnik et al. | 134/105 |

FOREIGN PATENT DOCUMENTS

| | | |
|---|---|---|
| 49-38889 | 4/1974 | Japan . |
| 5-42198 | 2/1993 | Japan . |
| 5-123678 | 5/1993 | Japan . |
| 8-155470 | 6/1996 | Japan . |

*Primary Examiner*—Diana Dudash
*Attorney, Agent, or Firm*—Oblon, Spivak, McClelland, Maier & Neustadt, P.C.

[57] ABSTRACT

Weathered reef-building coral is immersed in an aqueous alkali solution under reduced pressure to carry out alkali washing to make the aqueous alkali solution penetrate into the weathered reef-building coral throughout its fine structure inside the porous tissue, which is subsequently washed with water until a washing from the inside of the porous tissue is neutralized.

As a result of this washing, various marine algae, various microorganisms including Vibrio bacteria inhabiting the ocean and other various organic substances held in the inner fine structure of weathered reef-building coral can be removed. Thus, a weathered reef-building coral material can be obtained whose safety has been ensured. This weathered reef-building coral material is suitable for food materials, filter mediums for water purifiers and so forth.

13 Claims, 4 Drawing Sheets

WEATHERED REEF-BUILDING CORAL MATERIAL

TECHNICAL FIELD

This invention relates to a process for manufacturing a weathered reef-building coral material suitable for food materials, filter mediums and so forth, by removing organic substances originating from marine algae, microorganism and so forth held in porous tissue of weathered reef-building coral, and also relates to a weathered reef-building coral material obtained by this process and an immersion treating apparatus suitable for carrying out this process.

BACKGROUND ART

Coral insects inhabiting sea areas in the temperate zone, the subtropical zone and the tropical zone form coral reefs. The coral reefs weather and one after another turn into spalls or particles with lapse of thousands to tens of thousands of years after the death of coral insects living in the coral reefs. Such spalls or particles are carried by ocean currents, and they settle on the sea bed according to particle size by the action of the levigation in ocean currents and accumulate there. The weathered reef-building coral is an accumulation of such spalls or particles.

The weathered reef-building coral have a very porous fine structure. This porous fine structure is a dwelling site of the inhabitation of coral insects, and organic substances originating from various marine algae and microorganisms (e.g., Vibrio bacteria) inhabiting the ocean are held therein while the weathered reef-building coral exists at the sea bed for many years.

The weathered reef-building coral is utilized as food materials for supplementing calcium, or as filter mediums for water purifiers, agricultural soil conditioners and so forth. When it is used in food materials and filter mediums for water purifiers, it is required to remove the above organic substances from the viewpoint of safety, and is also required to take measures for disinfection or sterilization so that microbiological safety can be ensured.

As a conventional process by which weathered reef-building coral materials used as food materials are manufactured from the weathered reef-building coral, the following steps are taken, as schematically shown in FIG. 4.

That is, first, the weathered reef-building coral is collected from the sea bed by a pumping boat, and is classified according to manufacture purposes into portions with predetermined particle or grain size [e.g., passing a 10-mesh sieve (particle diameters of 2.0 mm or smaller) and leaving on a 80-mesh sieve (particle diameters of 0.18 mm or larger)]. The weathered reef-building coral thus classified is landed and thereafter stored in a stockyard, and the greater part of sea water salt is removed therefrom by spraying city water over the whole, followed by air-drying. This is then brought into a factory, and is sieved in the factory yard by a vibrating sifter according to the predetermined particle or grain size, which is again washed with water using a washing machine, followed by dehydration and drying and further followed by dry heat disinfection or dry sterilization usually at 100 to 200° C. The resultant material is pulverized and sifted to adjust their particle or grain size to a predetermined particle or grain size, and then packaged for commercialization. Alternatively, the material brought into a factory, sieved, and washed with water followed by dehydration and drying is then roasted at a temperature within the rage where calcium carbonate, the main component of the weathered reef-building coral, is not decomposed (250 to 600° C.), and this is pulverized and sifted to adjust their particle or grain size to a predetermined particle or grain size and then packaged for commercialization. The weathered reef-building coral material for food thus obtained is made to have particle diameters small enough to pass a 300-mesh sieve, i.e. particle diameters of 45 μm or smaller.

As a conventional process for manufacturing filter mediums for water purifiers, like the above process for manufacturing weathered reef-building coral materials for food, the weathered reef-building coral is collected, sieved in the factory yard by a vibrating sifter to sift grains to have a predetermined size to thereby uniform their grain size to a size suitable for the filter mediums for water purifiers, followed by washing with water, dehydration and drying. Subsequently, the resultant weathered reef-building coral is roasted (250 to 600° C.) so as to be activated to enhance mineral elution quantity, which is then sifted to adjust the grain size to a predetermined size, and packaged for commercialization.

Silver-added materials prepared by coating the weathered reef-building coral with silver are known to be improved in sterilizing ability (Japanese Patent Application Laid-open No. 51-179107, etc.). As the silver-added materials, those having grain diameters of 0.71 mm or larger which are used chiefly as filter mediums for water purifiers and those having grain diameters smaller than 0.71 mm which are used for other purposes are manufactured. As a process for manufacturing such silver-added materials, the filter mediums for water purifiers described above, the weathered reef-building coral is roasted in the same manner as in the case of the filter mediums for water purifiers described above. Thereafter, it is immersed in an aqueous silver solution, immersed in a reducing agent solution such as an ascorbic acid solution, and heated at 400° C. for about 30 minutes to cause silver to deposit, followed by washing with water, drying and packaging for commercialization.

However, in the conventional process for manufacturing weathered reef-building coral materials for food or filter mediums, various marine algae having grown for many years, various microorganisms including Vibrio bacteria inhabiting the ocean and other organic substances can not be removed from the inside of the porous fine structure of the weathered reef-building coral. Hence, the conventional process is insufficient in view of the ensuring of safety required for food materials.

In general, as well known, in water purifiers in which the weathered reef-building coral having been subjected to the step of heating by dry heat disinfection or dry sterilization, or by roasting is set as a filter medium, minerals flow out in a small quantity when water is run, so that the taste of water can be improved. However, the weathered reef-building coral materials obtained by the conventional process can not elute minerals so much as to greatly enhance total hardness elution quantity. Also, it has not a sufficient degree of activation and hence can not be said to have a good adsorptivity for impurities or the like.

In the case when the silver-added weathered reef-building coral material is manufactured, there is also the problem that the silver is coated only on the surface of the weathered reef-building coral and is not coated throughout the porous inner fine structure.

The present invention solves the above problems the prior art has had. Accordingly, an object thereof is to provide a weathered reef-building coral material from which various marine algae, various microorganisms including Vibrio bacteria inhabiting the ocean and other various organic substances held in the inner fine structure of weathered reef-building coral have been removed and thereby its safety required as food materials has been ensured, and also to provide a process for manufacturing such a weathered reef-building coral material.

Another object is to provide food materials and filter mediums comprised of such a weathered reef-building coral material.

Still another object is to provide a silver-added weathered reef-building coral material coated with silver on its surface and also throughout its fine structure inside the porous tissue, and also to provide a process for manufacturing such a weathered reef-building coral material.

A further object is to provide an apparatus useful for manufacturing such a weathered reef-building coral material.

DISCLOSURE OF THE INVENTION

To achieve the above objects, the present invention firstly provides a process for manufacturing a weathered reef-building coral material, comprising the steps of;

immersing weathered reef-building coral in an aqueous alkali solution under reduced pressure to carry out alkali washing to make the aqueous alkali solution penetrate into the weathered reef-building coral throughout its fine structure inside the porous tissue; and washing it with water until a washing from the inside of the porous tissue is neutralized.

Second, the present invention provides a weathered reef-building coral material obtained by the above process for manufacturing a weathered reef-building coral material.

Third, the present invention provides a food material comprising powdery weathered reef-building coral having a particle size of 500 meshes or greater (diameters of 27.28 $\mu$m or smaller), obtained by the above process for manufacturing a weathered reef-building coral material in which, after the washing with water, the weathered reef-building coral is further pulverized and sifted into it.

Fourth, the present invention provides a filter medium comprising weathered reef-building coral obtained by the above process for manufacturing a weathered reef-building coral material in which, after the washing with water, the weathered reef-building coral is roasted at 100 to 750° C.

Fifth, the present invention provides a process for manufacturing a silver-added weathered reef-building coral material, comprising, after the washing with water in the above process for manufacturing a weathered reef-building coral material;

subjecting the weathered reef-building coral to dry heat disinfection or dry sterilization, or roasting, followed by immersion in an aqueous silver solution under reduced pressure to make the aqueous silver solution penetrate into the weathered reef-building coral throughout its fine structure inside the porous tissue; and reducing the silver with a reducing agent to coat the weathered reef-building coral with silver throughout its fine structure inside the porous tissue;

and also provides a silver-added weathered reef-building coral material obtained by this manufacturing process.

Sixth, the present invention provides as an apparatus preferable for carrying out the above process for manufacturing a weathered reef-building coral material, an immersion treating apparatus comprising an enclosed container whose interior can be evacuated; a hollow cylindrical basket for holding the material to be processed, provided in the container; and an agitator blade which rotates within the hollow space to form a vertical liquid flow in the basket. In particular, in such an apparatus, the present invention provides an apparatus In which the basket holds weathered reef-building coral as the material to be processed, and the enclosed container is provided with a feed pipe for introducing a washing solution or a treatment solution into its interior and with a liquid discharge pipe for discharging an effluent from the enclosed container.

According to the process of the present invention for manufacturing a weathered reef-building coral material, the weathered reef-building coral is immersed in an aqueous alkali solution under reduced pressure to carry out alkali washing to make the aqueous alkali solution penetrate into the weathered reef-building coral throughout its fine structure inside the porous tissue. Hence, the various marine algae, various microorganisms including Vibrio bacteria inhabiting the ocean and other various organic substances held in the inner fine structure of weathered reef-building coral can be removed. Thus, a weathered reef-building coral material can be obtained whose safety required as food materials has been ensured.

In particular, its powdery material obtained by subjecting the weathered reef-building coral to dry heat disinfection or dry sterilization, or roasting so as to have a particle size of 500 meshes or greater (diameters of 27.28 $\mu$m or smaller) can ensure the safety required for food, and is preferable as food materials as being free from rough feeling when eaten.

The product obtained by roasting this weathered reef-building coral material at 100 to 750° C. is highly activated and is improved in adsorptivity of impurities, and hence can be a good filter medium.

The weathered reef-building coral may be subjected to dry heat disinfection or dry sterilization, or roasting, followed by immersion in an aqueous silver solution under reduced pressure to make the aqueous silver solution penetrate into the weathered reef-building coral throughout its fine structure inside the porous tissue, and subsequently the silver is reduced with a reducing agent, whereby a silver-added weathered reef-building coral material can be obtained which has been coated with silver also throughout its fine structure inside the porous tissue.

According to the immersion treating apparatus of the present invention, the weathered reef-building coral is put into the basket, and the aqueous alkali solution or water can be forcibly passed through the weathered reef-building coral held in the basket. Hence, the weathered reef-building coral can be completely immersed in the aqueous alkali solution or water throughout the former's inside of the porous tissue, so that the weathered reef-building coral can be washed in a good efficiency. In this instance, the weathered reef-building coral itself can also be washed without agitating it, and hence the weathered reef-building coral can be prevented from turning into fine powder after washing, so that the desired particle or grain diameter can be retained.

BEST MODE FOR WORKING THE INVENTION

The present invention will be described below in detail.

Figure 1:
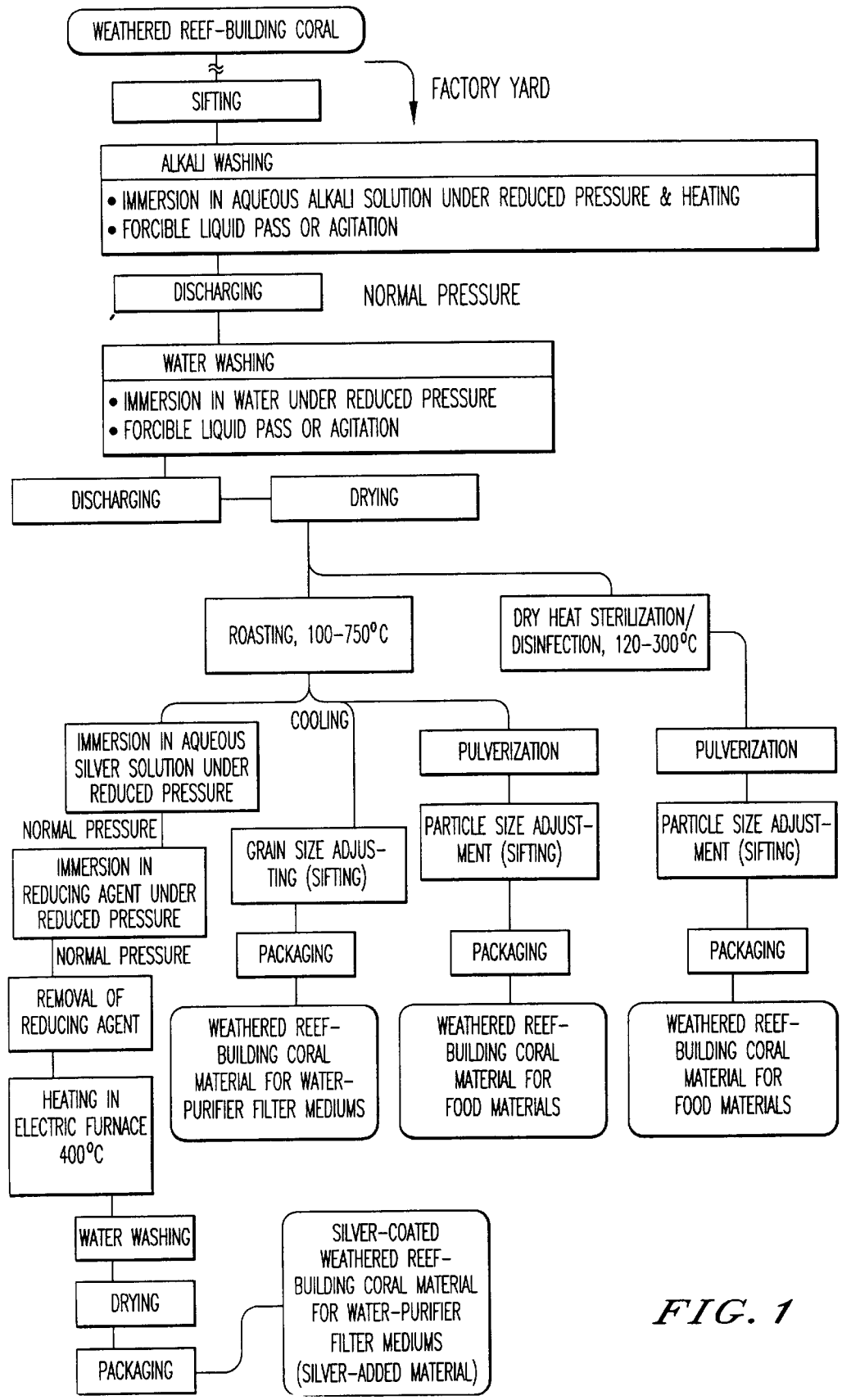
FIG. 1 is a flow chart of a process for manufacturing the weathered reef-building coral material and silver-added weathered reef-building coral material of the present invention.

FIG. 1 is a flow chart of a process for manufacturing the weathered reef-building coral material and silver-added weathered reef-building coral material of the present invention. This flow chart shows steps subsequent to the factory yard step in the conventional process for manufacturing weathered reef-building coral materials as shown in FIG. 4.

Figure 4:
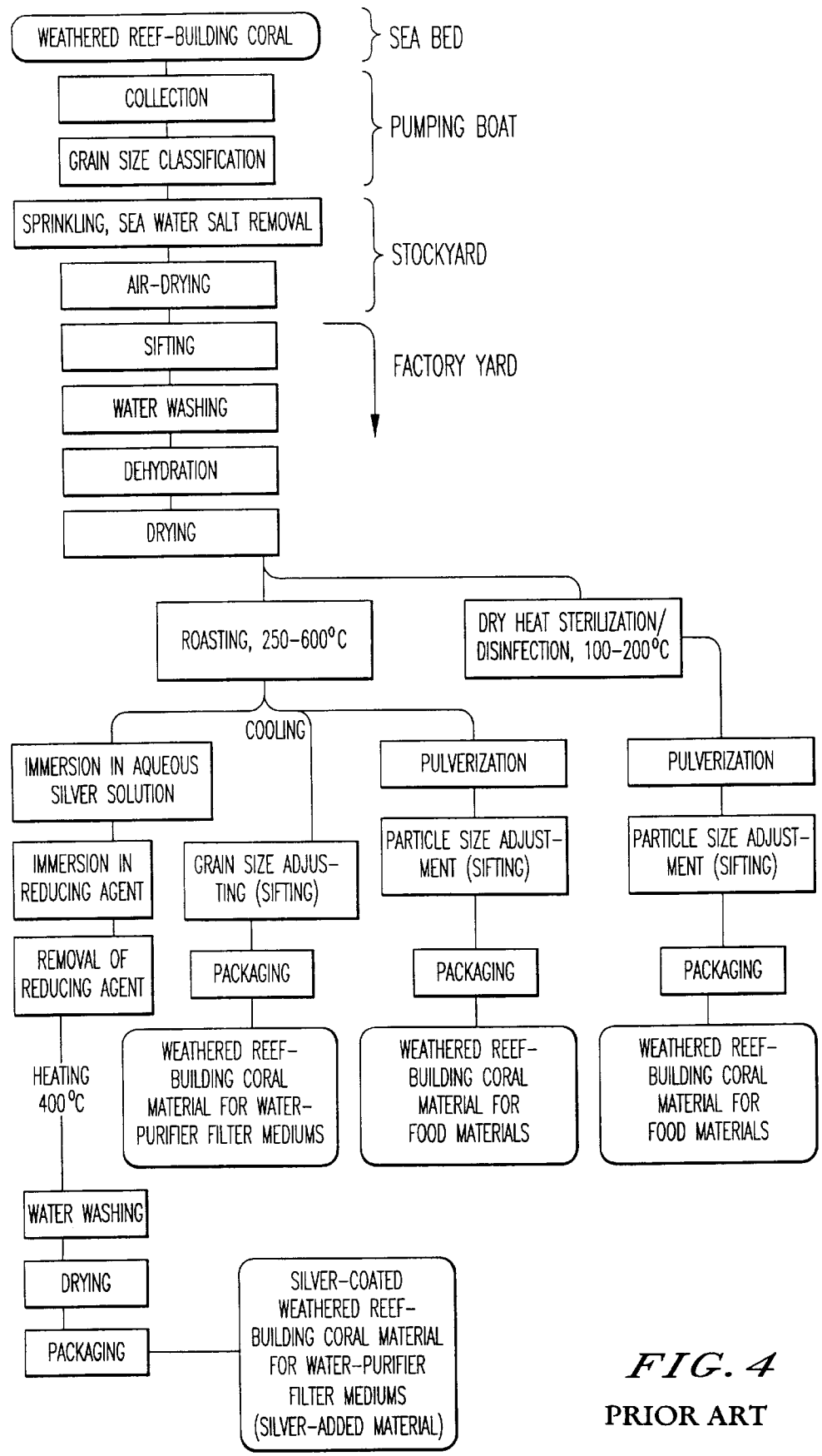
FIG. 4 is a flow chart of a conventional process for manufacturing weathered reef-building coral materials.

Steps prior to the factory yard step are the same as those shown in FIG. 4 as the flow chart of the conventional process. Thus, the weathered reef-building coral collected from the sea bed, which is then classified according to particle or grain size, and sprinkled with water to remove sea water salt, followed by air-drying, can be used as the weathered reef-building coral to be washed in the manufacturing process of the present invention.

As shown in FIG. 1, in the manufacturing process of the present invention, the weathered reef-building coral to be washed is first immersed in an aqueous alkali solution under reduced pressure to carry out alkali washing to make the aqueous alkali solution penetrate into the weathered reef-building coral throughout its fine structure inside the porous tissue. Optimum pressure in the system at the time of alkali washing depends on the particle or grain size of weathered reef-building coral having the shape of fragments, granules or powder. For example, when it is in the shape of fragments with an average grain diameter of from 0.18 mm to 0.71 mm, the pressure may preferably be controlled to be 70 mmHg or below. When it is in the shape of granules with an average grain diameter of from 8.0 mm to 16.0 mm, the pressure may preferably be controlled to be 30 mmHg or below.

As the aqueous alkali solution, an aqueous solution of NaOH, KOH, $Na_2CO_3$, $K_2CO_3$ or the like may preferably be used. A solution of a single alkali or a two or more, mixed alkali solution may also be used. There are no particular limitations on the concentration of the alkali. The aqueous alkali solution may be preferably in a concentration of from 0.01 N to 6 N, and more preferably from 0.1 N to 1 N. If the aqueous alkali solution has a concentration lower than 0.01 N, it is difficult to completely elute organic substances such as the marine algae or proteins originating from microorganisms and so forth held in the fine structure inside the porous tissue. If on the other hand the aqueous alkali solution has a concentration higher than 6 N, in the water washing in the later stage, the washing until the pH of the effluent becomes neutral must be carried out in a greatly larger number of times, bringing about a possibility of a decrease in operating efficiency.

The aqueous alkali solution in which the weathered reef-building coral has been immersed may preferably be heated to 80 to 100° C. for about 30 to 60 minutes. This enables acceleration of the alkali decomposition of the organic substances such as proteins held in the weathered reef-building coral.

It is also preferable to forcibly pass the aqueous alkali solution through the weathered reef-building coral (i.e., to form liquid flows so as to forcibly pass liquid flows of the aqueous alkali solution through the weathered reef-building coral immersed in the aqueous alkali solution) so that the aqueous alkali solution can effectively act on the weathered reef-building coral immersed therein, or to agitate the weathered reef-building coral immersed in the aqueous alkali solution. Agitation of the weathered reef-building coral causes the weathered reef-building coral to collide against each other during the agitation to make it ready to be formed into fine powder. Accordingly, in instances where the weathered reef-building coral may be finely powdered, it is preferable to agitate the weathered reef-building coral in the aqueous alkali solution. Also, in instances where it is intended to maintain the original grain size after the alkali washing, it is preferable to forcibly pass the aqueous alkali solution through the weathered reef-building coral.

After the alkali washing thus carried out, the inside of the system is restored to normal pressure to discharge the washing solution, and the next step is taken. Before the next step is taken, the alkali washing carried out under reduced pressure as described above may be repeated several times.

The water washing is, like the above alkali washing, carried out by immersing the weathered reef-building coral under reduced pressure in water. In this instance, city water may be used as the water, and hot water with a temperature of from about 40 to 60° C. may preferably be used. In this step of water washing, it is preferable to forcibly pass the water through the weathered reef-building coral or to agitate the weathered reef-building coral immersed in the water.

After the water washing, the inside of the system is restored to normal pressure to discharge the water, where the water washing is repeatedly operated until the pH of the effluent turn neutral. Hence, in usual instances, the step of water washing may be enough when carried out twice. In some instances, it must be carried out three to five times.

It is not preferable to use acid in place of the water in the step of water washing, because the use of acid may cause the decomposition of calcium carbonate, the main component of the weathered reef-building coral, and also a salt ascribable to the reaction to neutralize acid with alkali may be unwantedly formed inside the weathered reef-building coral.

The washing step comprising the alkali washing and the water washing may be completed usually in 30 to 60 minutes in total.

After the water washing, the weathered reef-building coral is dehydrated by means of a dehydrator (centrifugal separator) or the like, followed by drying.

The weathered reef-building coral thus obtained can be a weathered reef-building coral material usable in various purposes such as food materials, filter mediums and soil conditioners. Thus, the weathered reef-building coral is adjusted in particle or grain size according to such purposes, and then packaged so as to be sent to market as food materials, filter mediums or soil conditioners.

When, however, the weathered reef-building coral material is used as food materials, it may preferably be subjected to dry heat disinfection or dry sterilization, or roasting in order to ensure the microbiological safety.

Here, the dry heat disinfection is to make dry heat treatment to control bacteria concentration so as to be not more than 100 cells/10 g. The dry sterilization is to make dry heat treatment to control bacteria concentration so as to be not more than 10 cells/10 g. As this dry heat disinfection or dry sterilization, heat treatment may be made, e.g., at 120 to 300° C. for 30 to 60 minutes. As for the roasting, the weathered reef-building coral may preferably be roasted at 100 to 750° C., and may more preferably be roasted at at 250 to 750° C.

The weathered reef-building coral material of the present invention requires no particular limitations on its shape and size, and may have the form of, e.g., blocks, granules or powder. When, however, the weathered reef-building coral material is used as food materials, it may preferably be prepared in the form of a powder with a particle size of 500 meshes or greater (particle diameter of 27.28 μm or smaller) so that its texture as a food can be improved. This makes the food have a roughness-free, very smooth texture. Conventional weathered reef-building coral powders have been prepared in the form of powders with a particle size ranging from 150 meshes to 500 meshes (particle diameter of from 103 μm to 27.28 μm). Those having such a particle size give rough feeling in mouths when eaten, having a poor texture.

Figure 3:
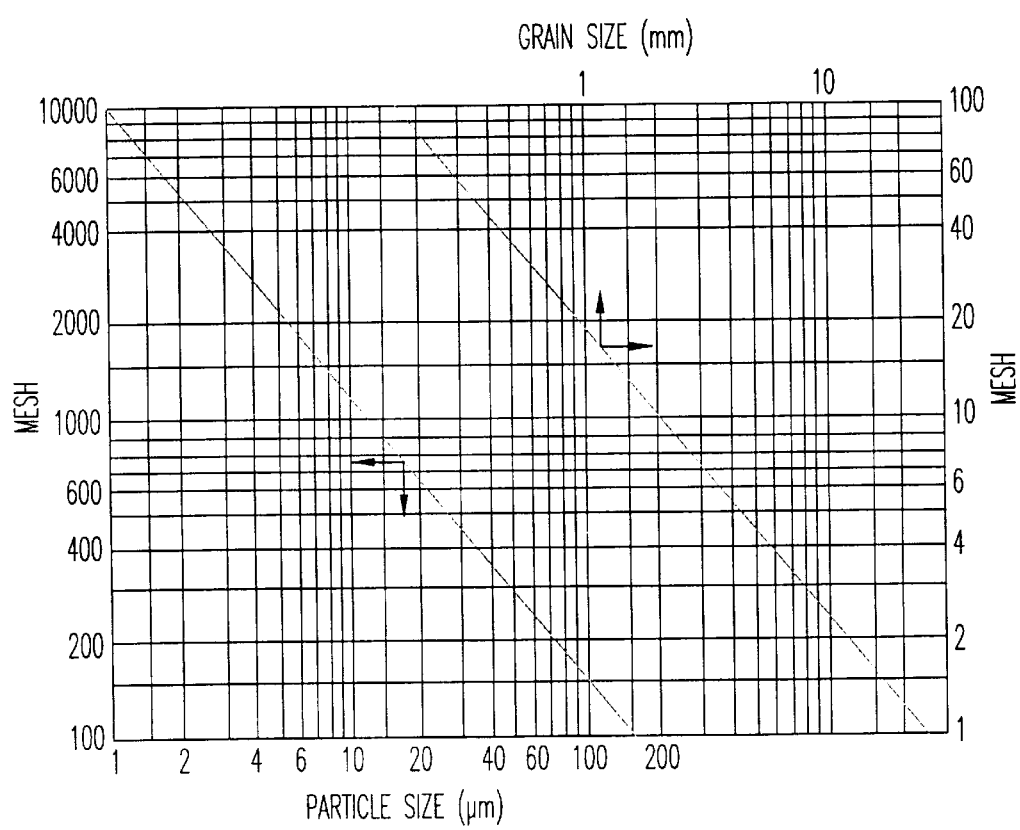
FIG. 3 show the relationship between mesh size and particle or grain size.

The "mesh" used in the present invention with regard to the prescription of this particle or grain size is a unit according to the ASTM sieve, called Tyler or Tyler sieve, which is widely used not only in The United States of America but also in other countries including Japan. For reference, the relationship between "mesh" and "particle or grain size (μm)" is shown in FIG. 3.

Meanwhile, when the weathered reef-building coral material is used as filter mediums, it may preferably be roasted at a temperature of from 100 to 750° C., and may more preferably be roasted at a temperature of from 250 to 750° C. This makes it possible to activate various properties such as smell adsorptivity, mineral elution performance and coloring-matter adsorptivity and to more improve the usefulness as filter mediums for water purifiers.

The weathered reef-building coral material can also be useful as materials for silver-added materials. More specifically, since in the weathered reef-building coral material of the present invention the material from which organic substances originating from the marine algae, microorganisms and so forth have been removed from all the fine structure inside the porous tissue, it is possible to coat the weathered reef-building coral with silver on its particle or grain surfaces and also throughout its fine structure inside the porous tissue. Hence, the silver-added material obtained by coating the weathered reef-building coral with silver according to the present invention can have a longer lifetime as filter mediums than conventional silver-added materials. It can also be improved in sterilization effect, and can have a superior sterilization effect against bacteria belonging to the genus of *Escherichia coli*, such as colon bacteria and pathogenic colon bacteria; diatopathogenic bacteria (sitotoxic or food poisoning bacteria) such as Salmonella, *Vibrio parahaemoliticus* and *Staphilococcus aureus; Bacillus anthracis* (anthrax bacilli); and Enterococcus.

As a process for manufacturing the silver-added material from the weathered reef-building coral material, like the above process for manufacturing food materials or filter mediums, the weathered reef-building coral washed with water after the alkali washing and then dried is further subjected to dry heat disinfection or dry sterilization, or roasting. In this instance, as the weathered reef-building coral used, it is preferable to use those sifted according to the purposes for which the silver-added material is used. For example, when the silver-added material is used as filter mediums, it is preferable to use those having a grain size of 0.71 mm or larger.

After the dry heat disinfection or dry sterilization, or roasting, the weathered reef-building coral is immersed in an aqueous silver solution under reduced pressure, whereby the aqueous silver solution is penetrated into the weathered reef-building coral throughout its fine structure inside the porous tissue. In this instance, as the aqueous silver solution, an aqueous silver nitrate solution or the like may preferably be used. Its concentration may be appropriately determined in accordance with the amount silver to be coated. Usually it may be controlled to be from 4 to 6% by weight. The degree of vacuum to be set when the weathered reef-building coral is immersed in the aqueous silver solution may be the same as the one in the case of the alkali washing or water washing described above.

After the weathered reef-building coral has been thus immersed in the aqueous silver solution, the aqueous silver solution is discharged, and a reducing agent is introduced so that the silver in the aqueous silver solution adhering to the weathered reef-building coral is reduced and deposited. As the reducing agent, an aqueous solution of reducing agent such as an ascorbic acid solution, an erysovine solution or a glucose solution may be used. In order for the weathered reef-building coral to be well coated with silver, it must be immersed in the reducing agent solution usually for a time of from about 30 to 60 minutes. Thereafter, any excess reducing agent solution is discharged, followed by heating, e.g., at about 400° C. for 30 to 60 minutes to complete the reduction of silver. In this instance, the heating may preferably be carried out after the weathered reef-building coral is moved from the reactor in which the reducing agent has been introduced, to an electric furnace or the like separately provided.

Thereafter, according to conventional methods, the steps of cooling, water washing, drying and packaging are taken up to commercialization.

When the silver-added material is thus manufactured, the time for which the weathered reef-building coral is immersed in the aqueous silver solution, which has had to be done for about 96 hours in conventional processes for manufacturing silver-added materials, can be shortened to about 30 to 60 minutes, and hence it becomes possible to dramatically improve the productivity of silver-added materials.

The immersion treating apparatus of the present invention, which is preferable for carrying out the process for manufacturing the weathered reef-building coral material of the present invention will be described below.

Figure 2:
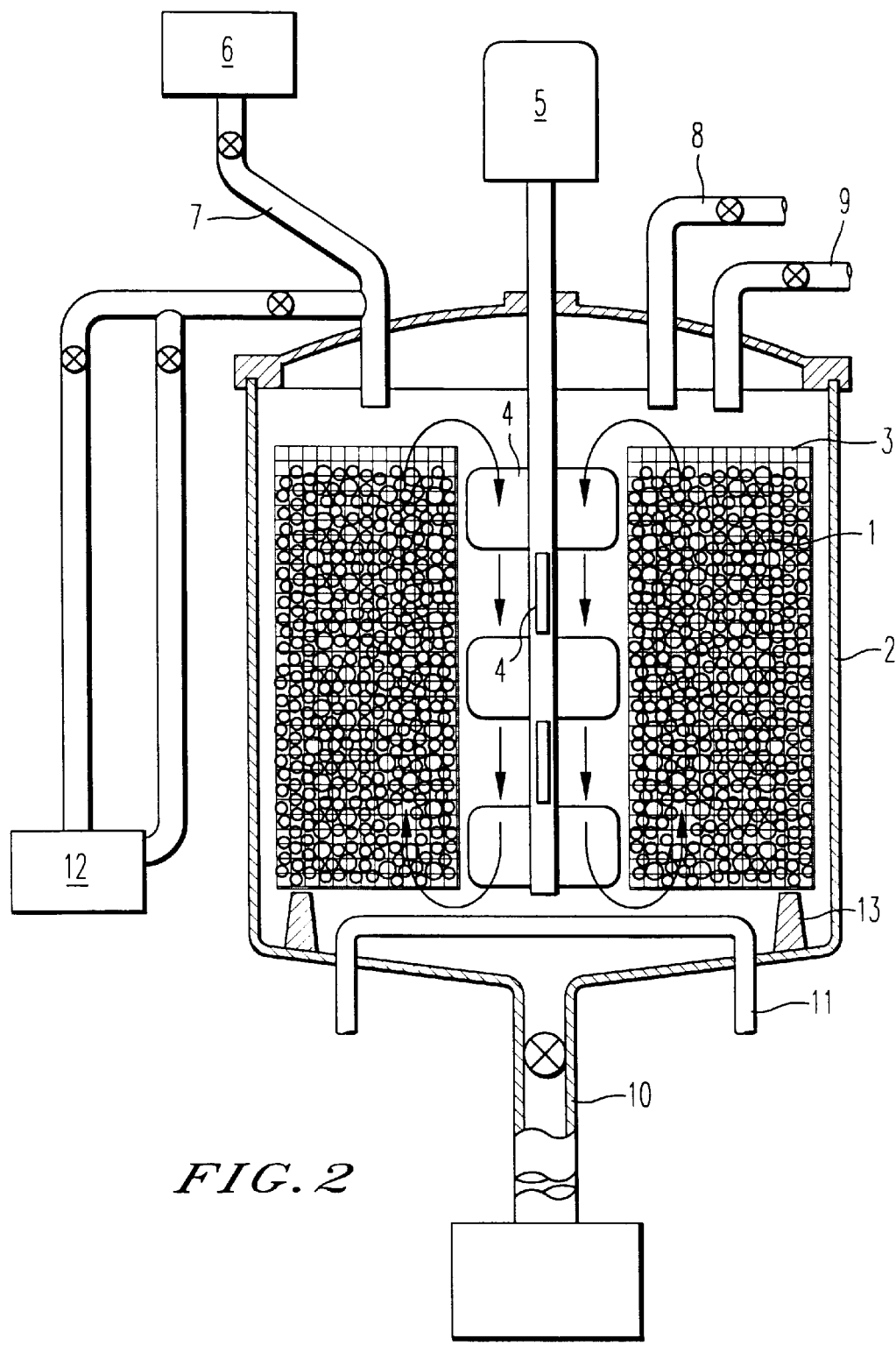
FIG. 2 illustrates the immersion treating apparatus of the present invention.

FIG. 2 illustrates an embodiment of the immersion treating apparatus for treating the weathered reef-building coral according to the present invention. The apparatus shown in FIG. 2 comprises an enclosed container 2 for internally holding weathered reef-building coral 1 to be treated; a hollow cylindrical basket 3 made of stainless steel, into which the weathered reef-building coral 1 is put inside the enclosed container; an agitator blade 4 positioned at the central hollow space of the basket 3; and a motor 5 for rotating the agitator blade 4. An aqueous alkali solution storage vessel 6 is also juxtaposed with the enclosed container 2. The enclosed container 2 is provided with a feed pipe 7 for introducing the aqueous alkali solution into the enclosed container 2 from the storage vessel 6. The enclosed container 2 is also provided with a feed pipe 8 for introducing the water or aqueous silver solution into the enclosed container 2, a feed pipe 9 for introducing the reducing agent into the enclosed container 2 and a liquid discharge pipe 10 for discharging the effluent from the enclosed container 2. These feed pipes 7, 8 and 9 and liquid discharge pipe 10 are further provided with valves for controlling the quantity of liquid to be introduced or discharged. At the bottom of the enclosed container 2, a heating pipe 11 for heating the inside of the enclosed container 2 is internally provided. To the enclosed container 2 a vacuum pump 12 for evacuating its inside is connected. Inside the enclosed container 2, the basket 3 is supported by four to six supports 13.

Here, with regard to the inner faces of at least the enclosed container 2, the feed pipes 7, 8 and 9 and the liquid discharge pipe 10, it is necessary for them to be formed of a metal having corrosion resistance to the aqueous alkali solution. As the vacuum pump 12, a vacuum pump is used which can evacuate the inside of the enclosed container 2 to a vacuum of 70 mmHg or below, and preferably 30 mmHg or below.

As a method for the alkali washing of the weathered reef-building coral 1 using this apparatus, first the weathered reef-building coral 1 is put in the basket 3 inside the enclosed container 2. Next, the aqueous alkali solution is introduced through the feed pipe 7. Then the vacuum pump 12 is operated to evacuate the inside of the enclosed container 2 to a vacuum of 70 mmHg or below, and preferably 30 mmHg or below. Concurrently with this evacuation, the motor 5 is driven to rotate the agitator blade 4, to thereby form liquid flows moving in the up and down vertical directions inside the basket 3, as shown by the arrow in FIG. 3, thus the aqueous alkali solution is forcibly passed through the weathered reef-building coral 1 put in the basket 3. Hot water is also passed through the heating pipe 11 to heat the enclosed container 2 to 80 to 100° C. Such alkali washing is usually carried out for 30 to 60 minutes. Thus, the marine algae, organic substances originating from microorganisms and so forth present on the surface and in the fine structure inside the porous tissue of the weathered reef-building coral 1 can be dissolved in the aqueous alkali solution and removed.

As the method for the alkali washing of the weathered reef-building coral 1 using the apparatus of FIG. 2, the step of immersing the weathered reef-building coral 1 in the aqueous alkali solution and the step of evacuating the inside of the enclosed container 2 may be replaced with each other so that the inside of the enclosed container 2 is evacuated by means of the vacuum pump 12 and thereafter the aqueous alkali solution is introduced to immerse the weathered reef-building coral 1 in the aqueous alkali solution. When the inside of the enclosed container 2 is evacuated after the weathered reef-building coral 1 has been immersed in the aqueous alkali solution, the alkali washing of the weathered reef-building coral 1 can be carried out in a good operability. In reverse, when the weathered reef-building coral 1 is immersed in the aqueous alkali solution after the inside of the enclosed container 2 has been evacuated, the aqueous alkali solution can be spread also throughout the fine structure inside the porous tissue in a short time.

After the alkali washing, the aqueous alkali solution having been used is discharged through the liquid discharge pipe 10.

As a method for washing the weathered reef-building coral with water after the above alkali washing, using the apparatus of FIG. 2, the aqueous alkali solution used in the alkali washing may be replaced with water, and the same operation as the above may be repeated. More specifically, the water is introduced into the enclosed container 2 through the feed pipe 8 to immerse the weathered reef-building coral 1 in the water, and then the inside of the enclosed container 2 is evacuated. Alternatively, the inside of the enclosed container 2 holding the weathered reef-building coral 1 is previously evacuated and thereafter the water is introduced into it through the feed pipe 8 to immerse the weathered reef-building coral 1 in the water. Then the agitator blade 4 is rotated to forcibly pass the water through the weathered reef-building coral 1 put in the basket 3. Thereafter, the washing water having been used is discharged through the liquid discharge pipe 10. This water washing is repeated until the pH of the washing water having been used from the liquid discharge pipe 10 turns neutral.

The apparatus shown in FIG. 2 may be used also for manufacturing the silver-added weathered reef-building coral material. In such an instance, the weathered reef-building coral 1 to be coated with silver is preferably subjected to the alkali washing and water washing described above, followed by drying, and is further subjected to dry heat disinfection or dry sterilization, or roasting. The resultant weathered reef-building coral 1 is put in the basket 3. Then the aqueous silver solution is introduced into the enclosed container 2 through the feed pipe 8 to well immerse the weathered reef-building coral in this aqueous silver solution under reduced pressure. Subsequently, the excess aqueous silver solution is discharged through the liquid discharge pipe 10, and thereafter the reducing agent solution such as an ascorbic acid solution is introduced through the feed pipe 9 under reduced pressure to reduce the aqueous silver solution having adhered to the surface and fine structure inside the porous tissue of the weathered reef-building coral 1. Subsequently, the remaining reducing agent solution is discharged through the liquid discharge pipe 10. Then, the resultant weathered reef-building coral is moved to a heating means such as an electric furnace separately provided, and is heated there at about 400° C. for 30 to 60 minutes. Thus, it becomes possible to obtain a silver-added material whose weathered reef-building coral has been coated with silver on its surface and also throughout its fine structure inside the porous tissue, and improved in sterilization effect.

The immersion treating apparatus of the present invention is useful for the alkali washing of the weathered reef-building coral and for manufacturing the silver-added material as described above. Besides, it can also be useful for any treatment accompanied by immersion, e.g., for washing, coating or extracting various materials to be treated. Stated specifically, it can be used as, e.g., an apparatus for extracting useful intended substances or physiologically active substances by immersing spices, plant roots or bark and dried products thereof, fruits or seeds, or other starting materials for food or medicine in an extraction solvent to extract such substances contained in the respective starting materials.

The immersion treating apparatus of the present invention may be modified in various forms in accordance with the purposes for which the apparatus is used, so long as it has the enclosed container whose interior can be evacuated; the hollow cylindrical basket for holding the material to be processed, provided in the container; and the agitator blade which rotates within the hollow space to form a vertical liquid flow in the basket. For example, the basket may be made of a material appropriately selected from those which are not attacked by the washing solution or treating solution used on the materials to be treated. Also, the net material constituting the basket may have any mesh size which may be appropriately determined in accordance with the size of the materials to be treated. The feed pipes for introducing the washing solution or treating solution and the liquid discharge pipe may also not necessarily be provided on the enclosed container.

The present invention will be described below in greater detail by giving Examples. The present invention is by no means limited to these Examples.

EXAMPLE 1

Parent material weathered reef-building coral was set on a vibratory screen to sift it, and 20 kg of weathered reef-building coral with a grain size of 2 mm to 1 mm was put in the basket 3 in the enclosed container 2 of the apparatus shown in FIG. 2. To pre-wash this weathered reef-building coral, city water was introduced through the feed pipe 8, the agitator blade 4 was rotated to forcibly pass the water through the weathered reef-building coral for 30 minutes. The washing solution was sent as an effluent to an effluent treating tank through the liquid discharge pipe 10.

Next, as the operation of alkali washing, first the vacuum pump 12 was driven to evacuate the inside of the enclosed container 2 to a vacuum of 10 mm H2O, and 25 liters of an aqueous 0.1 N sodium hydroxide solution beforehand prepared in the storage vessel 6 was introduced into the enclosed container 2 through the feed pipe 7. Thereafter, hot water with a temperature of 80° C. was passed through the heating pipe 11 to heat for 30 minutes the inside of the enclosed container 2 in which the aqueous sodium hydroxide solution was being forcibly passed through the weathered reef-building coral. After this alkali washing was completed, the hot water was stopped being fed to the heating pipe 11 and also the vacuum state of the inside of the enclosed container 2 was restored to normal pressure. Then, the aqueous sodium hydroxide solution in the enclosed container 2 was completely discharged through the liquid discharge pipe 10.

City water was again introduced through the feed pipe 8, and the same operation as the above was repeated except for using the city water in place of the above aqueous alkali solution, to carry out water washing. This water washing was repeatedly carried out twice. More specifically, after the first-time water washing, the water discharged through the liquid discharge pipe 10 was collected to measure its pH to find that it was 8.1. The pH of the effluent after the second-time water washing turned to 7.0. Accordingly, the water washing was stopped after that.

This alkali washing and water washing took 30 minutes in total time.

A sample obtained after the water washing followed by dehydration and drying was used as a specimen, and its crude protein content and the number of general bacteria (cells/g) were measured. Here, the crude protein content was calculated from the total nitrogen by the semimicro-Kjeldahl method, and the number of general bacteria (cells/g) was measured by a microbiological test (the standard agar medium method). For comparison, the crude protein content and the number of general bacteria were also measured on the parent material weathered reef-building coral. Results obtained are shown in Table 1.

EXAMPLE 2

Alkali washing was carried out in the same manner as in Example 1 except that the weathered reef-building coral with a grain size of 2 mm to 1 mm used in Example 1 was replaced with 20 kg of weathered reef-building coral with a grain size of 5 mm to 4 mm and 25 liters of the aqueous 0.1 N sodium hydroxide solution was replaced with an aqueous 1.0 N sodium hydroxide solution. Then the aqueous sodium hydroxide solution in the tank was completely discharged.

Thereafter, water washing was repeated in the same manner as in Example 1, and the pH of the effluent was measured every time the water washing was completed. As the result, the pH values of the effluent at the first to third times were 8.8, 8.1 and 7.4, respectively, and the pH value of the effluent at the fourth time turned to 7.0. Accordingly, the water washing was stopped after that.

This alkali washing and water washing took 55 minutes in total time.

A sample obtained after the water washing followed by dehydration and drying was used as a specimen, and its crude protein content and the number of general bacteria were measured in the same manner as in Example 1. For comparison, the crude protein content and the number of general bacteria were also measured on the parent material weathered reef-building coral. Results obtained are shown in Table 1.

TABLE 1

|  | Example 1 | Example 2 |
|---|---|---|
| Manufacturing process | | |
| Parent material: | | |
| Grain diameter: (mm) | 2–1 | 5–4 |
| Sampling weight: (kg) | 20 | 20 |
| Pre-washing: | | |
| Degree of vacuum: (mmH$_2$O) | 10 | 10 |
| Time: (min) | 30 | 30 |
| Alkali washing: | | |
| Alkali concentration: | 0.1N | 1.0N |
| Degree of vacuum: (mmH$_2$O) | 10 | 10 |
| Heating: (° C.) | 80 | 80 |
| (min) | 30 | 30 |
| Water washing: | | |
| Degree of vacuum: (mmH$_2$O) | 10 | 10 |
| Washing times: | 2 | 4 |
| Evaluation | | |
| Crude protein content: | | |
| Parent material: (g) | 0.9/100 | 0.9/100 |
| After washing: (g) | 0.04/100 | 0.03/100 |
| Number of general bacteria: | | |
| Parent material: (cells/g) | $3.1 \times 10^2$ | $3.1 \times 10^2$ |
| After washing: (cells/g) | <30 | <30 |

EXAMPLE 3

Alkali washing was carried out in the same manner as in Example 1 except that the weathered reef-building coral with a grain size of 2 mm to 1 mm used in Example 1 was replaced with weathered reef-building coral with a grain size of 8 mm to 5 mm. Then the aqueous sodium hydroxide solution in the tank was completely discharged. Subsequently, the water washing was repeatedly carried out twice in the same manner as in Example 1, and the pH of the effluent was confirmed to have turned to 7.0.

Thereafter, the water washing, dehydration and drying were carried out, further followed by roasting (500° C., 60 minutes), cooling and grain size adjustment (sifting) to obtain a filter medium for water purifiers.

The number of general bacteria (cells/g) of the filter medium for water purifiers thus obtained were measured in the same manner as in Example 1 by a microbiological test (the standard agar medium method). In order to judge the adsorptivity of this filter medium, 50 g of this filter medium was put into a column of 130 mm in inner diameter and 130 mm in height to make a decoloring test using 100 ml of 0.002% methylene blue. Then the rate of adsorption of methylene blue present in the methylene blue solution having passed through the column was determined according to the following expression:

$$\text{Rate of adsorption (\%)} = \frac{\text{(transmittance of methylene blue solution after passing through column)}}{\text{(transmittance of methylene blue solution before passing through column)}} \times 100.$$

The activity of this filter medium was also calculated according to:

Activity (%)=100−rate of adsorption.

Results obtained on these are shown in Table 2.

EXAMPLE 4

Alkali washing was carried out in the same manner as in Example 2 except that the weathered reef-building coral with a grain size of 5 mm to 4 mm used in Example 2 was replaced with 20 kg of weathered reef-building coral with a grain size of 8 mm to 5 mm. Subsequently, the water washing was carried out four times, and the pH of the effluent was confirmed to have turned to 7.0.

Thereafter, the water washing, dehydration and drying were carried out, further followed by roasting (500° C., 60 minutes), cooling and grain size adjustment (sifting) to obtain a filter medium for water purifiers.

The number of general bacteria (cells/g) of the filter medium for water purifiers thus obtained were measured in the same manner as in Example 3. In order to judge the adsorptivity of this filter medium, the decoloring test was made in the same manner as in Example 3, to determine the rate of adsorption of methylene blue and the activity.

Results obtained on these are shown in Table 2.

EXAMPLES 5 AND 6

Filter mediums for water purifiers were obtained in the same manner as in Example 4 except that the concentration of the aqueous sodium hydroxide solution used in the alkali washing was changed. In respect of the filter mediums thus obtained, the decoloring test was carried out to determine the rate of adsorption of methylene blue and the activity.

As can be seen from comparison of Examples 3 to 6, the activity increases with an increase in the concentration of the aqueous sodium hydroxide solution, and the microorganisms and other organic substances in the water can be adsorbed to purify the water.

COMPARATIVE EXAMPLE 1

The parent material weathered reef-building coral used in Example 3 was only pre-washed. Then, in respect of the weathered reef-building coral thus obtained, in the same manner as in Example 3, the number of general bacteria (cells/g) was measured and the decoloring test was carried out to determine the rate of adsorption of methylene blue and the activity. Results obtained on these are shown in Table 2.

COMPARATIVE EXAMPLE 2

The parent material weathered reef-building coral used in Example 3 was pre-washed, and the resultant weathered reef-building coral was roasted in the same manner as in Example 3. Then, in respect of the weathered reef-building coral thus obtained, in the same manner as in Example 3, the number of general bacteria (cells/g) was measured and the decoloring test was carried out to determine the rate of adsorption of methylene blue and the activity. Results obtained on these are shown in Table 2.

TABLE 2

|  | Example | | | | Comparative Example | |
| --- | --- | --- | --- | --- | --- | --- |
|  | 3 | 4 | 5 | 6 | 1 | 2 |
| Manufacturing process | | | | | | |
| Parent material: | | | | | | |
| Grain diameter: (mm) | 8–5 | 8–5 | 8–5 | 8–5 | 8–5 | 5–4 |
| Sampling weight: (kg) | 20 | 20 | 20 | 20 | 20 | 20 |
| Pre-washing: | | | | | | |
| Degree of vacuum: (mmH$_2$O) | 10 | 10 | 10 | 10 | 10 | 10 |
| Time: (min) | 30 | 30 | 30 | 30 | 30 | 30 |
| Alkali washing: | | | | | | |
| Alkali concentration: | 0.1N | 1.0N | 2.0N | 6.0N | | |
| Degree of vacuum: (mmH$_2$O) | 10 | 10 | 10 | 10 | | |
| Heating: (° C.) | 80 | 80 | 80 | 80 | | |
| (min) | 30 | 30 | 30 | 30 | | |
| Water washing: | | | | | | |
| Degree of vacuum: (mmH$_2$O) | 10 | 10 | 10 | 10 | | |
| Washing times: | 2 | 4 | 4 | 4 | | |
| Roasting: | | | | | | |
| Temperature: (° C.) | 500 | 500 | 500 | 500 | | 500 |
| Time: (min) | 60 | 60 | 60 | 60 | | 60 |
| Evaluation | | | | | | |
| Number of general bacteria: | | | | | | |
| (cells/g) | <30 | <30 | <30 | <30 | 6.9 × 10$^2$ | 1.7 × 10$^2$ |
| Decoloring test: | | | | | | |
| Rate of adsorption: (%) | 58.9 | 14.2 | 10.8 | 9.1 | 98.9 | 82.7 |
| Activity: (%) | 41.4 | 85.8 | 89.2 | 90.9 | 1.1 | 17.3 |

EXAMPLE 7

Using the filter medium for water purifiers obtained in Example 3, this was put in the basket 3 in the enclosed container 2 of the apparatus shown in FIG. 2, the inside of the enclosed container 2 was evacuated, 20 liters of an aqueous silver nitrate solution with 5% silver was introduced into it, and the agitator blade 4 was rotated for 30 minutes to forcibly pass the aqueous silver nitrate solution through the filter medium.

After the aqueous silver nitrate solution was discharged, 20 liters of an aqueous 1.5% ascorbic acid solution was introduced through the feed pipe 9, and the agitator blade 4 was rotated for 30 minutes to forcibly pass the aqueous silver nitrate solution through the filter medium. Subsequently, the ascorbic acid solution was discharged through the liquid discharge pipe 10, and the resultant weathered reef-building coral was taken out of the enclosed container 2 and put into a 400° C. electric furnace to heat it for 50 minutes. After the heating was completed, cooling, water washing, drying and grain size adjustment were successively carried out, followed by packaging to obtain a product of a silver-added material. The silver-added material thus obtained had a silver coating weight as shown in Table 3.

EXAMPLE 8

A silver-added material was obtained in the same manner as in Example 7 except that the weathered reef-building coral material obtained in Example 4 was used.

The silver-added material thus obtained had a silver coating weight as shown in Table 3.

COMPARATIVE EXAMPLE 3

A silver-added material was obtained in the same manner as in Example 7 except for using one obtained by only pre-washing the parent material weathered reef-building coral used in Example 3.

The silver-added material thus obtained had a silver coating weight as shown in Table 3.

TABLE 3

|  | Example | | Comparative |
| --- | --- | --- | --- |
|  | 7 | 8 | Example 3 |
| Manufacturing process | | | |
| Parent material: | | | |
| Grain diameter: (mm) | 8–5 | 8–5 | 8–5 |
| Sampling weight: (kg) | 20 | 20 | 20 |
| Pre-washing: | | | |
| Degree of vacuum: (mmH$_2$O) | 10 | 10 | |
| Time: (min) | 30 | 30 | |
| Alkali washing: | | | |
| Alkali concentration: | 0.1N | 1.0N | |
| Degree of vacuum: (mmH$_2$O) | 10 | 10 | |
| Heating: (° C.) | 80 | 80 | |
| (min) | 30 | 30 | |
| Water washing: | | | |
| Degree of vacuum: (mmH$_2$O) | 10 | 10 | |
| Washing times: | 2 | 4 | |
| Roasting: | | | |
| Temperature: (° C.) | 500 | 500 | |
| Time: (min) | 60 | 60 | |
| Silver coating: | | | |
| Silver solution concentration: (wt. %) | 5 | 5 | 5 |
| Reducing agent concentration: (wt. %) | 1.5 | 1.5 | 1.5 |
| Evaluation | | | |
| Silver coating weight: (mg/g) | 15 | 20 | 10 |

EXAMPLE 9

Weathered reef-building coral materials obtained in Examples 1 and 2 were each pulverized by means of a pulverizer WONDER BLENDER (manufactured by Osaka Chemical Co., Ltd.), and a portion with a particle size of 500 meshes or greater (particle diameter of 27.28 μm or smaller) was separate and collected. This was used as a food material comprised of the weathered reef-building coral material (i.e., coral calcium powder for food, or weathered reef-building coral powder for food).

31.0% by weight of this food material comprised of the weathered reef-building coral material, 23.8% by weight of lactose, 12.5% by weight of maltitol, 6.5% by weight of sucrose, 2.7% by weight of vitamin C, 4.7% by weight of CPP (casein phosphopeptide) and 18.8% by weight of dextrin were mixed, and prepared into granules. The texture of the granules was evaluated by five panelists. As the result, all the panelists evaluated that the granules have a smooth texture free of roughness.

The particle size of this weathered reef-building coral material was also analyzed using a laser diffraction type particle size distribution measuring apparatus (SALD-2000 manufactured by SHIMAZU SEISAKUSHO) in the following way. First, a small quantity of sample was collected in a 200 mL beaker, and methanol (first grade) was added thereto as a dispersant, followed by dispersion for about 2 minutes by ultrasonic irradiation to obtain a measurement sample. Next, methanol was previously put in a circulatory agitating tank, and the above measurement sample was introduced into it while applying propeller agitation, in such an extent that the diffracted/scattered light intensity came to be 30 to 40%, further followed by ultrasonic irradiation for about 1 minute to measure the particle size distribution.

Results obtained are shown in Table 4.

TABLE 4

| Particle diameter (μm) | Integrated value (%) | Particle diameter (μm) | Integrated value (%) | Particle diameter (μm) | Integrated value (%) |
| --- | --- | --- | --- | --- | --- |
| (1) 700.00 | 100 | (18) 22.91 | 99 | (35) 0.75 | 4 |
| (2) 572.45 | 100 | (19) 18.73 | 98 | (36) 0.61 | 2 |
| (3) 468.14 | 100 | (20) 15.32 | 95 | (37) 0.50 | 1 |
| (4) 382.84 | 100 | (21) 12.53 | 90 | (38) 0.41 | 0 |
| (5) 313.08 | 100 | (22) 10.25 | 83 | (39) 0.34 | 0 |
| (6) 256.04 | 100 | (23) 8.38 | 75 | (40) 0.27 | 0 |
| (7) 209.38 | 100 | (24) 6.85 | 65 | (41) 0.22 | 0 |
| (8) 171.23 | 100 | (25) 5.60 | 56 | (42) 0.18 | 0 |
| (9) 140.03 | 100 | (26) 4.58 | 48 | (43) 0.15 | 0 |
| (10) 114.51 | 100 | (27) 3.75 | 40 | (44) 0.12 | 0 |
| (11) 93.65 | 100 | (28) 3.07 | 34 | (45) 0.10 | 0 |
| (12) 76.58 | 100 | (29) 2.51 | 28 | (46) 0.082 | 0 |
| (13) 62.63 | 100 | (30) 2.05 | 23 | (47) 0.067 | 0 |
| (14) 51.22 | 100 | (31) 1.68 | 18 | (48) 0.055 | 0 |
| (15) 41.89 | 100 | (32) 1.37 | 14 | (49) 0.045 | 0 |
| (16) 34.25 | 100 | (33) 1.12 | 10 | (50) 0.037 | 0 |
| (17) 28.01 | 100 | (34) 0.92 | 7 | (51) 0.030 | 0 |

10.0% D: 1.127    50.0% D: 4.810    90.0% D: 12.394
Median diameter: 4.810    Mode diameter: 7.577
Average value: 4.222    Standard deviation: 0.391

Possibility of Industrial Utilization

According to the process of the present invention for manufacturing a weathered reef-building coral material, a weathered reef-building coral material can be obtained from which the various marine algae, various microorganisms including Vibrio bacteria inhabiting the ocean and other various organic substances held in the inner fine structure of weathered reef-building coral have been removed and whose safety has been ensured. This weathered reef-building coral material can be used in various purposes. In particular, it is suitable for food materials. According to the present invention, a filter medium for water purifiers can also be obtained which has a high mineral elution quantity and a high activity.

According to the present invention, a silver-added material can also be obtained whose weathered reef-building coral has been coated with silver on its surface and also throughout its fine structure inside the porous tissue.

According to the immersion treating apparatus of the present invention, the process of the present invention for manufacturing a weathered reef-building coral material can be carried out with ease. The immersion treating apparatus of the present invention can also be useful not only for the treatment of the weathered reef-building coral but also for the treatment of, e.g., washing, coating or extraction of various materials to be treated.

We claim:

1. A process for manufacturing a weathered reef-building coral material, comprising the steps of;

immersing weathered reef-building coral in an aqueous 0.1N to 6N alkali solution under reduced pressure to carry out alkali washing to make the aqueous alkali solution penetrate into the weathered reef-building coral throughout its fine structure inside the porous tissue; and washing it with water until a washing from the inside of the porous tissue is neutralized, wherein said alkali washing is carried out by forcibly passing the aqueous alkali solution through the weathered reef-building coral immersed in the aqueous alkali solution or is carried out by agitating the weathered reef-building coral in said aqueous alkali solution and wherein the aqueous alkali solution is heated.

2. The process for manufacturing a weathered reef-building coral material according to claim 1, wherein said aqueous alkali solution comprises an aqueous solution of NaOH, KOH, $Na_2CO_3$ or $K_2CO_3$.

3. The process for manufacturing a weathered reef-building coral material according to claim 1, wherein the water washing is carried out by immersing the weathered reef-building coral in water under reduced pressure and forcibly passing the water through the weathered reef-building coral.

4. The process for manufacturing a weathered reef-building coral material according to claim 1, wherein the water washing is carried out by immersing the weathered reef-building coral in water under reduced pressure and agitating the weathered reef-building coral in the water.

5. The process for manufacturing a weathered reef-building coral material according to claim 1, wherein, after the washing with water, the weathered reef-building coral is subjected to dry heat disinfection or dry sterilization, or roasting, and thereafter pulverized and sifted to make it into a powder having a particle diameter of 27.28 μm or smaller.

6. The process for manufacturing a weathered reef-building coral material according to claim 1, wherein, after the washing with water, the weathered reef-building coral is roasted at 100 to 750° C.

7. A process for manufacturing a silver-added weathered reef-building coral material, comprising, after the washing with water in the process for manufacturing a weathered reef-building coral material according to claim 1;

subjecting the weathered reef-building coral to dry heat disinfection or dry sterilization, or roasting, followed by immersion in an aqueous silver solution under reduced pressure to make the aqueous silver solution penetrate into the weathered reef-building coral throughout its fine structure inside the porous tissue; and reducing the silver with a reducing agent to coat the weathered reef-building coral with silver throughout its fine structure inside the porous tissue.

8. A weathered reef-building coral material obtained by the manufacturing process according to claim 1.

9. A food material comprising the weathered reef-building coral material obtained by the manufacturing process according to claim 5.

10. A filter medium comprising the weathered reef-building coral material obtained by the manufacturing process according to claim 6.

11. A silver-added material comprising the weathered reef-building coral material obtained by the manufacturing process according to claim 7.

12. The method according to claim 1, wherein the alkali washing and water washing is conducted for a period of 30 to 60 minutes.

13. A process according to claim 1, wherein the reduced pressure is 70 mmHg or less.

* * * * *